United States Patent
Xu

(10) Patent No.: US 9,596,621 B2
(45) Date of Patent: Mar. 14, 2017

(54) SIGNALING TRAFFIC REDUCTION IN MOBILE COMMUNICATION SYSTEMS

(71) Applicant: iBasis, Inc., Lexington, MA (US)

(72) Inventor: Richard H. Xu, Wakefield, MA (US)

(73) Assignee: IBASIS, INC., Lexington, MA (US)

( * ) Notice: Subject to any disclaimer, the term of this patent is extended or adjusted under 35 U.S.C. 154(b) by 158 days.

(21) Appl. No.: 13/960,268

(22) Filed: Aug. 6, 2013

(65) Prior Publication Data

US 2014/0043969 A1   Feb. 13, 2014

Related U.S. Application Data

(60) Provisional application No. 61/681,787, filed on Aug. 10, 2012.

(51) Int. Cl.
*H04W 28/02* (2009.01)
*H04L 29/08* (2006.01)
*H04L 29/06* (2006.01)
*H04W 8/10* (2009.01)
*H04W 12/06* (2009.01)

(52) U.S. Cl.
CPC ..... *H04W 28/0289* (2013.01); *H04L 63/0892* (2013.01); *H04L 67/141* (2013.01); *H04W 8/10* (2013.01); *H04W 12/06* (2013.01)

(58) Field of Classification Search
CPC ... H04W 28/0289; H04W 12/06; H04W 8/10; H04L 67/141; H04L 63/0892
See application file for complete search history.

(56) References Cited

U.S. PATENT DOCUMENTS

| | | |
|---|---|---|
| 5,586,177 A | 12/1996 | Farris et al. |
| 7,912,477 B2 | 3/2011 | Tamura et al. |
| 8,095,109 B2 | 1/2012 | Rydnell et al. |
| 8,175,575 B2 | 5/2012 | Cai et al. |
| 8,179,903 B2 | 5/2012 | Gupta et al. |
| 8,458,183 B2 * | 6/2013 | Kawai et al. ................. 707/737 |

(Continued)

FOREIGN PATENT DOCUMENTS

| | | |
|---|---|---|
| EP | 1 189 473 A2 | 3/2002 |
| WO | WO 00/56085 | 9/2000 |

(Continued)

OTHER PUBLICATIONS

Notification of Transmittal of the International Search Report and the Written Opinion of the International Searching Authority, International Application No. PCT/US2013/053783, Date of Mailing: Nov. 8, 2013, entitled, "Signaling Traffic Reduction In Mobile Communication Systems"

(Continued)

*Primary Examiner* — Anh-Vu Ly
*Assistant Examiner* — Hector Reyes Ortiz
(74) *Attorney, Agent, or Firm* — Hamilton, Brook, Smith & Reynolds, P.C.

(57) ABSTRACT

In an embodiment, a method for reducing signaling traffic between certain service elements in mobile communication systems includes receiving signaling initiated from one service element at a signaling routing agent where the signaling routing agent determines whether the received signaling needs to be sent to its destined service element. If the signaling is not sent, signaling traffic to the destined service element is reduced.

20 Claims, 7 Drawing Sheets

(56) References Cited

U.S. PATENT DOCUMENTS

| | | | |
|---|---|---|---|
| 8,566,474 B2* | 10/2013 | Kanode et al. | 709/238 |
| 8,578,050 B2* | 11/2013 | Craig et al. | 709/238 |
| 2008/0285492 A1 | 11/2008 | Vesterinen | |
| 2009/0047947 A1 | 2/2009 | Giaretta et al. | |
| 2009/0073995 A1 | 3/2009 | Pandey et al. | |
| 2009/0168694 A1 | 7/2009 | Akselin et al. | |
| 2009/0268668 A1 | 10/2009 | Tinnakornsrisuphap et al. | |
| 2010/0027533 A1 | 2/2010 | Kant et al. | |
| 2010/0121933 A1* | 5/2010 | Booton | 709/207 |
| 2010/0128677 A1 | 5/2010 | Liu et al. | |
| 2010/0144344 A1 | 6/2010 | Jiang | |
| 2010/0190470 A1 | 7/2010 | Raleigh | |
| 2010/0191612 A1 | 7/2010 | Raleigh | |
| 2010/0195621 A1 | 8/2010 | Kekki et al. | |
| 2010/0197268 A1 | 8/2010 | Raleigh | |
| 2010/0208658 A1 | 8/2010 | Vesterinen | |
| 2010/0232353 A1 | 9/2010 | Hu et al. | |
| 2010/0272063 A1 | 10/2010 | Kato et al. | |
| 2011/0026453 A1 | 2/2011 | Yan | |
| 2011/0076985 A1 | 3/2011 | Chami et al. | |
| 2011/0116382 A1* | 5/2011 | McCann et al. | 370/241 |
| 2011/0116499 A1 | 5/2011 | Lim et al. | |
| 2011/0130117 A1 | 6/2011 | Fan et al. | |
| 2011/0158171 A1 | 6/2011 | Centonza et al. | |
| 2011/0170517 A1 | 7/2011 | Bakker et al. | |
| 2011/0171953 A1 | 7/2011 | Faccin et al. | |
| 2011/0176531 A1 | 7/2011 | Rune et al. | |
| 2011/0223887 A1 | 9/2011 | Rune et al. | |
| 2011/0225632 A1 | 9/2011 | Ropolyi et al. | |
| 2011/0235595 A1 | 9/2011 | Mehta et al. | |
| 2011/0235605 A1 | 9/2011 | Yeoum et al. | |
| 2011/0271320 A1* | 11/2011 | Andreasen | 726/1 |
| 2011/0286384 A1 | 11/2011 | Sugimoto et al. | |
| 2011/0292896 A1 | 12/2011 | Yeuom et al. | |
| 2012/0003980 A1 | 1/2012 | Lim et al. | |
| 2012/0020284 A1 | 1/2012 | Haddad | |
| 2012/0039213 A1 | 2/2012 | Cheng et al. | |
| 2012/0039323 A1 | 2/2012 | Hirano et al. | |
| 2012/0044949 A1 | 2/2012 | Velev et al. | |
| 2012/0046058 A1 | 2/2012 | Vesterinen et al. | |
| 2012/0057463 A1 | 3/2012 | Hurtta et al. | |
| 2012/0082161 A1 | 4/2012 | Leung et al. | |
| 2012/0084184 A1 | 4/2012 | Raleigh et al. | |
| 2012/0093074 A1 | 4/2012 | Sairanen et al. | |
| 2012/0099573 A1 | 4/2012 | Jalkanen | |
| 2012/0101952 A1 | 4/2012 | Raleigh et al. | |
| 2012/0102174 A1 | 4/2012 | Zhou et al. | |
| 2012/0106508 A1 | 5/2012 | Zhou et al. | |
| 2012/0110193 A1 | 5/2012 | Zhou et al. | |
| 2012/0117251 A1 | 5/2012 | Zhou et al. | |
| 2012/0124220 A1 | 5/2012 | Zhou et al. | |
| 2012/0155389 A1* | 6/2012 | McNamee et al. | 370/328 |
| 2012/0202550 A1* | 8/2012 | Marsico | H04W 8/08 455/515 |
| 2012/0269162 A1 | 10/2012 | Vesterinen et al. | |
| 2012/0278851 A1* | 11/2012 | Dan | 726/1 |
| 2012/0311064 A1* | 12/2012 | Deo | 709/213 |
| 2013/0109348 A1* | 5/2013 | Sharma | H04W 12/08 455/411 |
| 2013/0325941 A1* | 12/2013 | Mann et al. | 709/204 |

FOREIGN PATENT DOCUMENTS

| | | |
|---|---|---|
| WO | WO 01/65872 A1 | 9/2001 |
| WO | WO 2007/109955 A1 | 10/2007 |
| WO | WO 2009/024182 A1 | 2/2009 |
| WO | WO 2009/101638 A2 | 8/2009 |
| WO | WO 2011/072438 A1 | 6/2011 |
| WO | WO 2011/080744 A1 | 7/2011 |
| WO | WO 2012/050841 A1 | 4/2012 |
| WO | WO 2012/064980 A1 | 5/2012 |
| WO | WO 2012/075934 A1 | 6/2012 |

OTHER PUBLICATIONS

"$3^{rd}$ Generation Partnership Project; Technical Specification Group Core Network and Terminals; IP Multimedia Call Control Protocol Based on Session Initiation Protocol (SIP) and Session Description Protocol (SDP); Stage 3; Release 11," *3GPP TS 24.229*, V11.6.0, (Dec. 2012), 777 pages.

"$3^{rd}$ Generation Partnership Project; Technical Specification Group Core Network and Terminals; Inter-IMS Network to Network Interface (NNI); Release 11," *3GPP TS 29.165*, V11.5.0, (Dec. 2012), 127 pages.

"$3^{rd}$ Generation Partnership Project; Technical Specification Group Services and System Aspects; General Packet Radio Service (GPRS) Enhancements for Evolved Universal Terrestrial Radio Access Network (E-UTRAN) Access; Release 11," *3GPP TS 23.401*, V11.0.0, (Dec. 2012), 287 pages.

"GSMA LTE Roaming Guidelines, Version 7.0," *GSM Association; Official Document IR.88*, (Jan. 31, 2012), 42 pages.

Sanyal, R., "Challenges in Interoperability and Roaming between LTE—Legacy core for Mobility Management, Routing, Real Time Charging," *Telecom World (ITU WT), 2011 Technical Symposium at ITU*, pp. 116-122, IEEE Conference Publications (2011).

Copeland, R. and Crespi, N., "Resolving Ten MVNO Issues with EPS Architecture, VoLTE and Advanced Policy Server," *Intelligence in Next Generation Networks (ICIN), 2011 15$^{th}$ International Conference on Digital Object Identifier*: 10.1109/ICIN.2011.6081093, pp. 29-34, IEEE Conference Publications (2011).

Lim, H., et al., "Reducing Communication Overhead for Nested NEMO Networks: Roaming Authentication and Access Control Structure," *IEEE Transactions on Vehicular Technology*, 60(7): 3408-3423 (Sep. 2011).

Nishiyama, H., et al., "A Cooperative User-System Approach for Optimizing Performance in Content Distribution/Delivery Networks," *IEEE Journal on Selected Areas in Communications*, 30(2): 476-483 (Feb. 2012).

Clark, M., et al., "Preparing for LTE Roaming," Syniverse Technologies [online], May 2011 [retrieved from the Internet URL: http://www.syniverse.com/files/LTE-Roaming-BARG-Workshop-bj.pdf.] Located via Google.

Motorola, Inc., "Long Term Evolution (LTE): A Technical Overview," Technical White Paper [online], 2007 [retrieved from the Internet: www.motorola.com.], 15 pages.

* cited by examiner

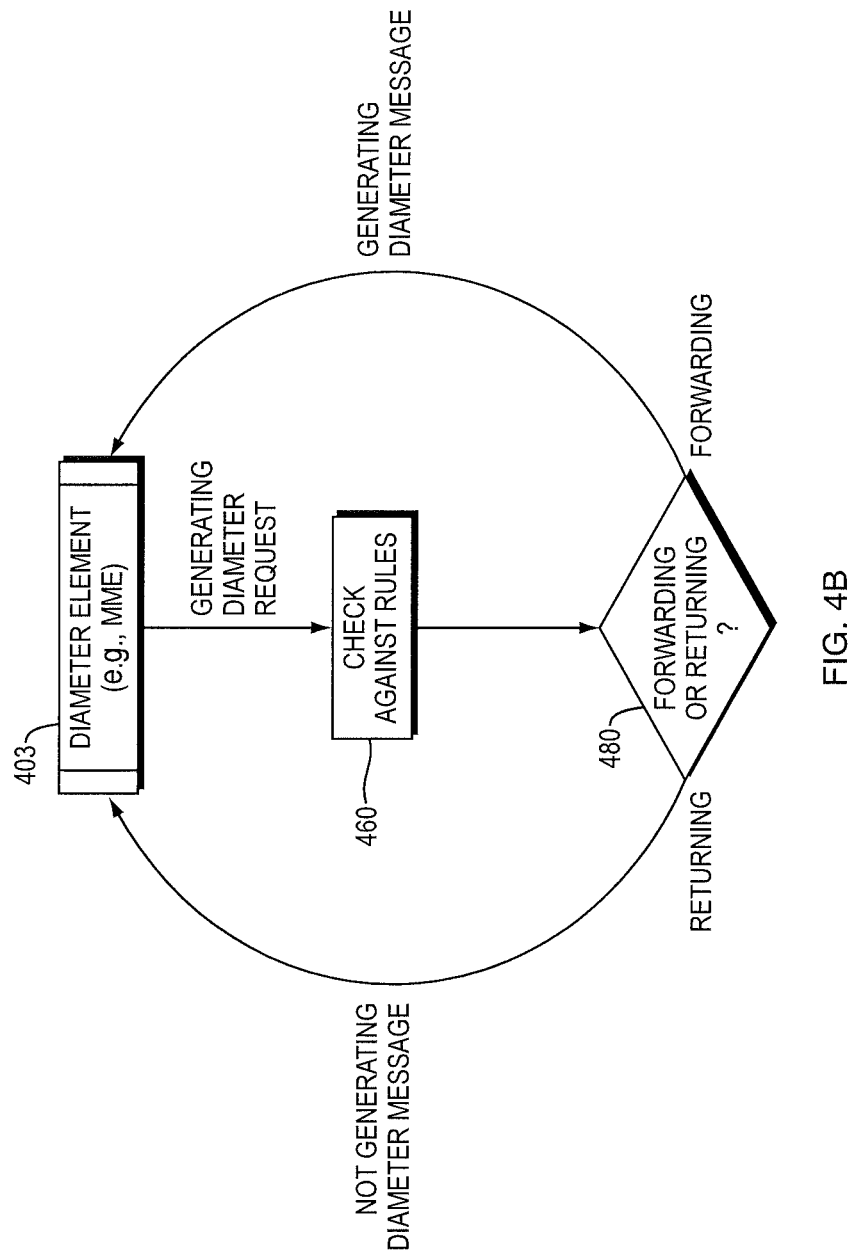

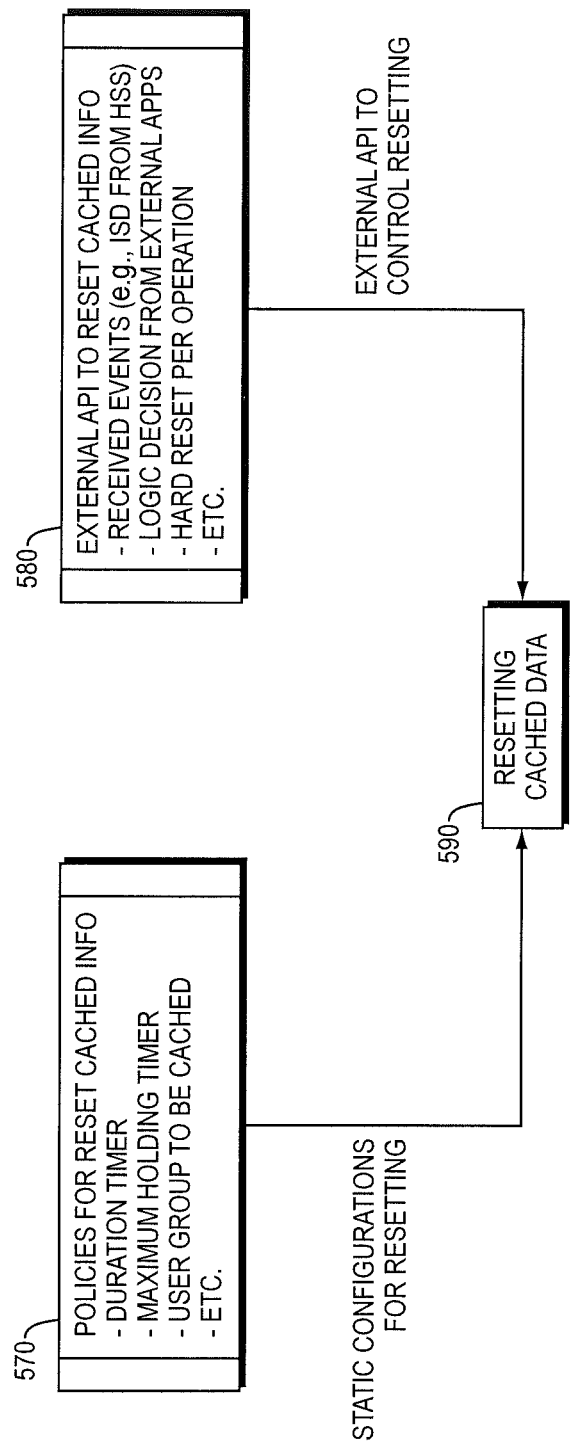

SIGNALING TRAFFIC REDUCTION IN MOBILE COMMUNICATION SYSTEMS

RELATED APPLICATION

This application claims the benefit of U.S. Provisional Application No. 61/681,787, filed on Aug. 10, 2012. The entire teachings of the above application are incorporated herein by reference.

BACKGROUND

FIG. 1 is a block diagram illustrating an example architecture for a Long Term Evolution (LTE) mobile communication system 100, also referred to as Evolved Packet System (EPS) or 4G. LTE architecture introduces several new service elements, compared to other mobile communication systems' architecture, such as the Mobility Management Entity (MME) 101, the control node which processes the signaling between the User Equipment (UE) and the Core Network (CN) and provides Visitor Location Register (VLR) functionality for the EPS; the Serving Gateway (S-GW) 115, a gateway which terminates the interface towards the Evolved Universal Terrestrial Radio Access Network (E-UTRAN); the Packet Data Network (PDN) Gateway (P-GW) 117, a gateway which terminates the interface towards the Packet Data Network; the Policy Control and Charging Rules Function (PCRF) 107, which encompasses policy control decision and flow-based charging control functionalities; and the Home Subscriber Server (HSS) 103, an entity containing subscription-related information to support the network entities handling calls/sessions.

The communication or signaling between different elements of the LTE mobile communications system 100 generates a significant amount of traffic due to the new architecture and new procedures associated with its all-IP infrastructure. One of the key signaling protocols used is the Diameter protocol, an IP-based protocol employed over many interfaces, such as S6a interface 105, Gx interface 109, and Rx interface 111. Signaling or Diameter Signaling traffic is generated due to many actions initiated by the UE, such as requesting to access the network, and network defined procedures such as Track Area Update and retrieving user's service policies via Gx interface 109 at the P-GW 117, and so on.

Some of the signaling interfaces are extended to other LTE mobile communication systems or networks in order to fulfill LTE mobile roaming services when LTE UE access LTE services from a visited LTE Mobile Operator.

FIG. 2 is a block diagram depicting a LTE roaming reference architecture. As indicated in the block diagram, the signaling generated from the MME 101 at the visited mobile network over the S6a interface 105 and from the P-GW 117 over the Gx interface 109 are meant to reach the home network HSS 103a and home network PCRF (H-PCRF) 107a, respectively, during roaming. The H-PCRF 107a and the visited network PCRF (V-PCRF) 107b are coupled through an S9 interface 218. The S9 interface 218 bridges the local Gx signaling over the V-PCRF 107b to the H-PCRF 107a, where the users' service policies are defined and stored.

Given typical LTE architectures and the signaling associated with UE actions and LTE-defined procedures, LTE operators deploying LTE mobile systems may encounter overwhelming levels of Diameter and other IP-based signaling traffic such as GTP tunnel protocol used for establishing IP access for UE 113. Such signaling bursts are often referred to as a signaling storm. Some LTE networks have been brought down due to such signaling storms.

To mitigate signaling storm issues, a variety of solutions have been brought forth that focus on the signaling flow from UE 113, S-GW 115 and P-GW 117. For example, to optimize Diameter signaling operation and reduce full-mesh diameter connections among Diameter elements, e.g., the Diameter elements MME 101, HSS 103, P-GW 115, and PCRF 107a or 107b, etc., a central Diameter Agent (DA) or Diameter Routing Agent (DRA) may be introduced within the LTE core network to provide centralized routing, traffic management, and load balancing among Diameter elements. FIG. 3 shows two block diagrams illustrating a bilateral full-mesh architecture and centralized DA based architecture, respectively. The bilateral full-mesh architecture is not scalable as it involves coupling each pair of Diameter elements, e.g., 301-305, through a communication channel. In the centralized DA based architecture, a DA 310 is deployed within an LTE core network. The DA 310 is coupled to the Diameter elements, e.g., 301-305, and acts as a routing agent. The Diameter Element, e.g., 301-305, may be an element such as MME 101, HSS 103, P-GW 117, or the like. Likewise, a DA, or DRA, 310 may be deployed within an LTE roaming network coupling, for example, the MME 101 in the visited network and the HSS 103 in the home network. Typically, a DRA is provided in a third party network, which is connected to both the visited and home network, as intermediary service provider.

SUMMARY

Although the Diameter signaling traffic is managed efficiently via DRA 310, from a whole network perspective, e.g., reducing the full-mesh connection into a single connection, the Diameter signaling traffic volume among the Diameter elements still affects negatively on the core network if one or a few Diameter elements are not keeping up the capacity in handling the Diameter Signaling. One way to mitigate such a problem is to increase the capacity of the affected Diameter element. However, increasing the capacity of Diameter element(s) may not always be a practical or feasible solution.

In the present disclosure, embodiments are disclosed for reducing at the DA, or DRA, 310, the signaling traffic volume before it reaches destination Diameter Element(s).

According to at least one example embodiment, a method for handling signaling in a mobile communication system comprises: receiving, at a network device a signaling message associated with a user from an origination signaling element, the signaling message destined for a destination signaling element; determining, by the network device, whether or not to forward the signaling message to the destination signaling element based on one or more rules for handling signaling; and forwarding the signaling message to the destination signaling element or returning a response to the origination signaling element based on a result of said determining.

According to at least one other example embodiment, a network device for handling signaling in a mobile communication system comprises a processor and a memory with computer code instructions stored thereon, the processor and the memory, with the computer code instructions, are configured to cause the network device to: receive a signaling message associated with a user from an origination signaling element, the signaling message destined for a destination signaling element; determine whether or not to forward the signaling message to the destination signaling element based on one or more rules for handling signaling; and forward the signaling message to the destination signaling element or returning a response to the origination signaling element based on a result of said determining.

In case the decision is to forward the signaling message to the destination signaling element, the network device receives a response from the destination signaling element and returns the response to the originating signaling element. The network device also stores information associated with the signaling message or the response. The information stored includes static or infrequently changed information associated with the user and included in the signaling message or the response. The information stored is reset according to one or more resetting rules.

According to an example rule for handling the signaling, the received signaling message is forwarded upon determining that the received signaling message received is an authentication information request (AIR) message. According to another example rule for handling the signaling, the received signaling message is forwarded upon determining that the received signaling message received is the first of its kind. According to another rule, a response is returned to the origination signaling element if information for responding to a request associated with the received signaling message is previously stored and accessible to the network device, otherwise forwarding the signaling message to the destination signaling element. Also, upon determining that the signaling message associated with the user is received from the same origination signaling element as a previously received signaling message associated with the user, forwarding the received signaling message to the destination signaling element if the received signaling message is an authentication information request (AIR) message, otherwise returning a response to the origination signaling message. According to yet another rule, upon determining that the signaling message received and another previously received signaling message, both associated with the user, are received from different origination signaling elements and both messages are associated with an Internet protocol (IP) address, forwarding the signaling message to the destination signaling element only if the signaling message is the first authentication information request (AIR) message or the first update location request message received.

According to an example implementation, the signaling message received is a Diameter protocol message. However, a person of ordinary skill in the art should appreciate that other types of signaling message, e.g., other than a Diameter protocol signaling message, may be employed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4B shows a rule-based logic flow for reducing signaling traffic volume within an existing signaling element;

FIG. 5B shows a logic flow for controlling reset of cached information.

DETAILED DESCRIPTION

A description of example embodiments follows.

For the purpose of explanation, S6a and S9 Diameter signaling in LTE mobile communication systems are used as examples. It should be understood, however, that the present disclosure may be applicable to other communication systems which may experience similar signaling traffic storm issues.

According to one or more embodiments, a method may be implemented at the DA/DRA 310 or at one or more of the involved Diameter Elements, e.g., 301, 302 . . . , or 305, to reduce LTE Diameter signaling traffic. When using DA, or DRA, 310, the received signaling message, e.g., Diameter Message, from a Diameter Element such as the MME 101 in the LTE core network is analyzed to determine whether to forward the signaling message to its destined Diameter Element such as the HSS 103. If forwarding the signaling message is avoidable, the DA, or DRA, 310 is configured to respond to the received signaling message, and thereby reduce the signaling traffic volume to the destined Diameter Element. Different rules may be created with a variety of pre-defined or heuristic criteria to be used in the determination of how to handle the received signaling messages.

For example, an MME 101 may generate an Authentication Information Request (AIR) message towards an associated HSS 103 when an UE 113 tries to attach to an LTE network. Such AIR messages are typically forwarded to the HSS 103 without any delay. Thus, a rule may be defined to do as such, without delaying the received message. In another example, the MME 101 may regularly send Location Update messages triggered by Track Area Update (TAU) procedure to an associated HSS 103. For such Location Update messages, it may not be efficient for the HSS 103 to keep receiving them for certain devices such an LTE Data Modem. In such case, a rule may be defined to reflect such scenario at the DA/DRA 310 to respond to a Location Update message directly without forwarding to the HSS 103.

Figure 1:
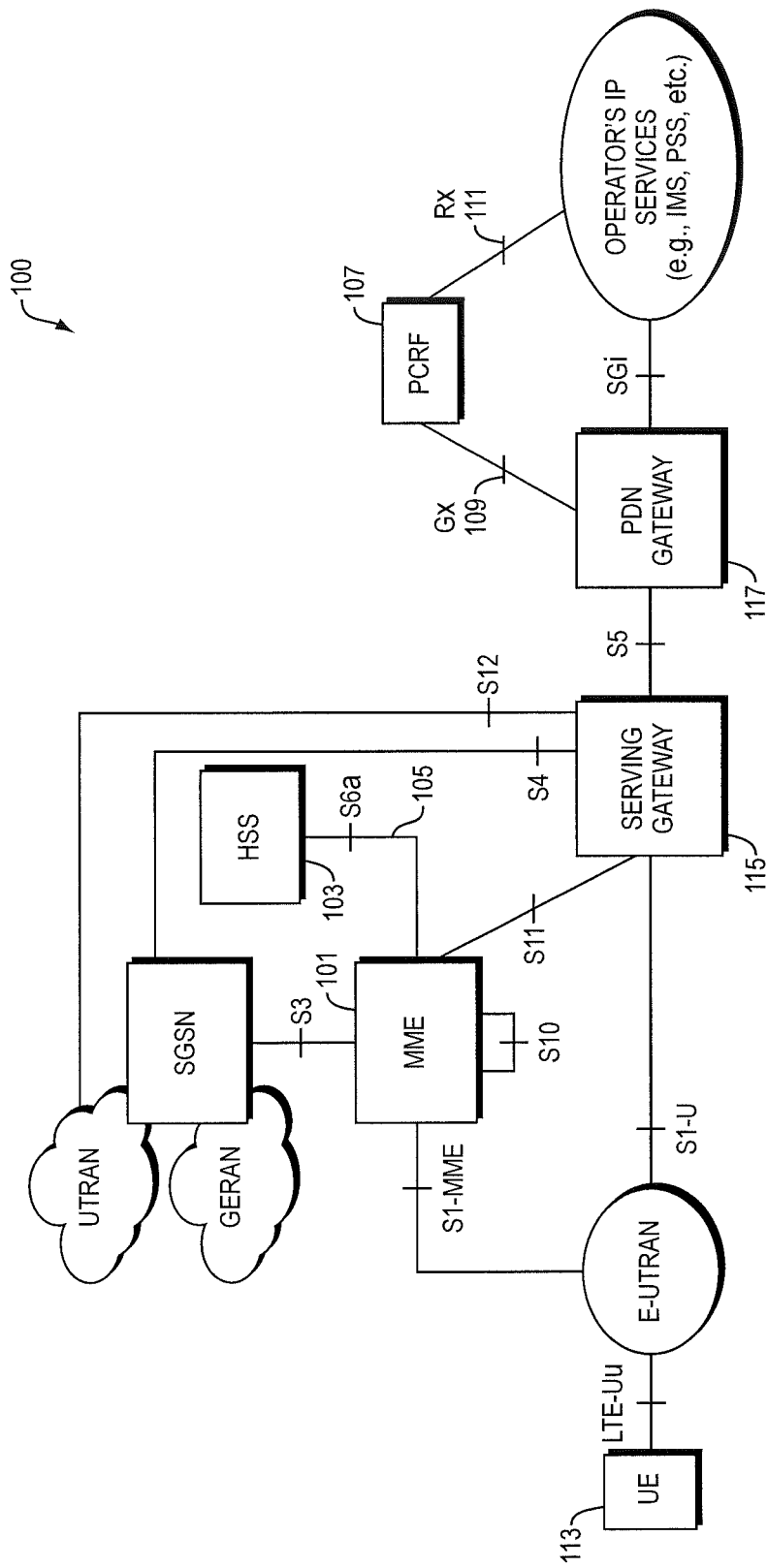
FIG. 1 is a block diagram illustrating an example architecture for a Long Term Evolution (LTE) mobile communication system.
Figure 2:
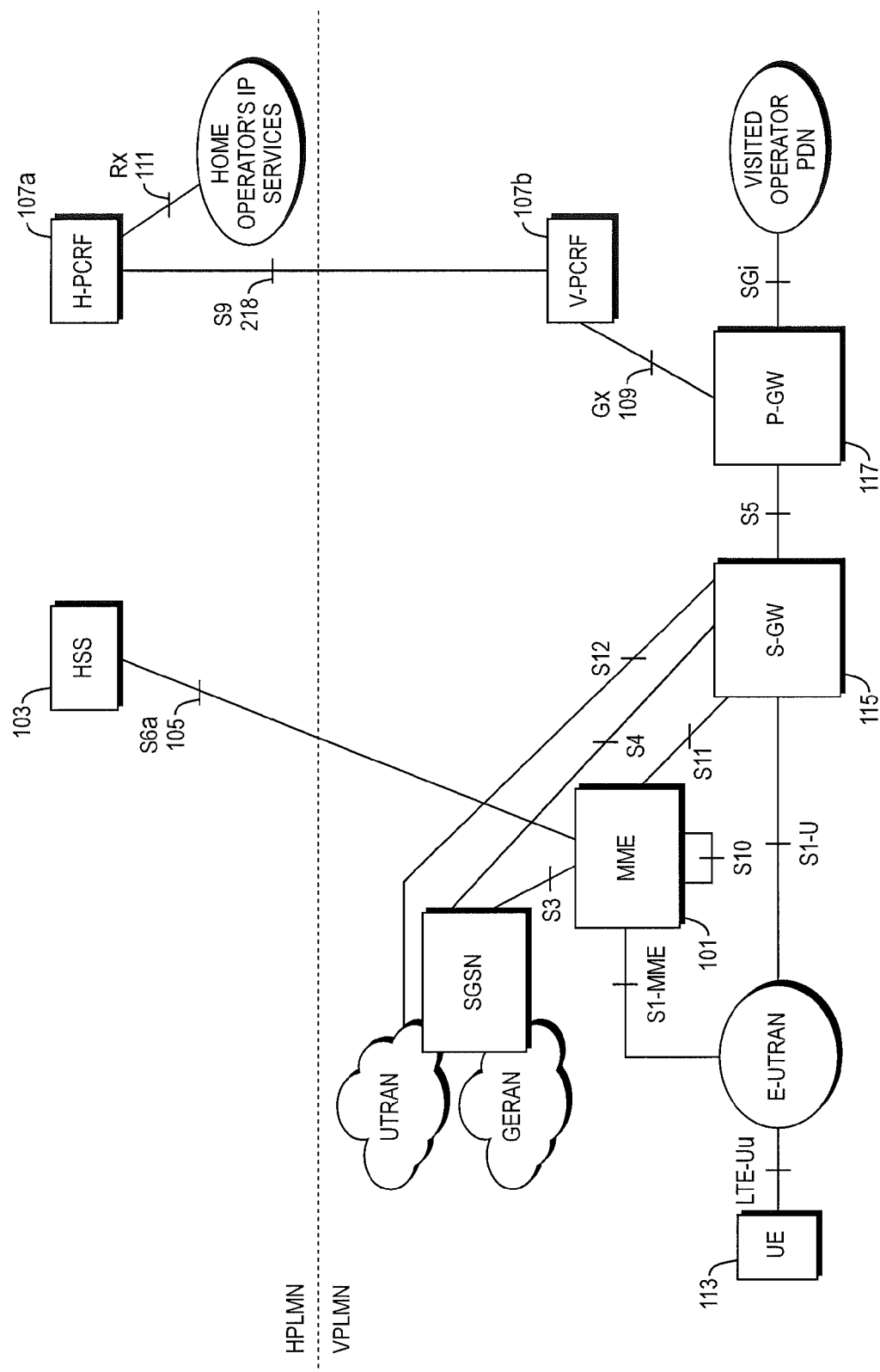
FIG. 2 is a block diagram depicting a LTE roaming architecture.
Figure 3:
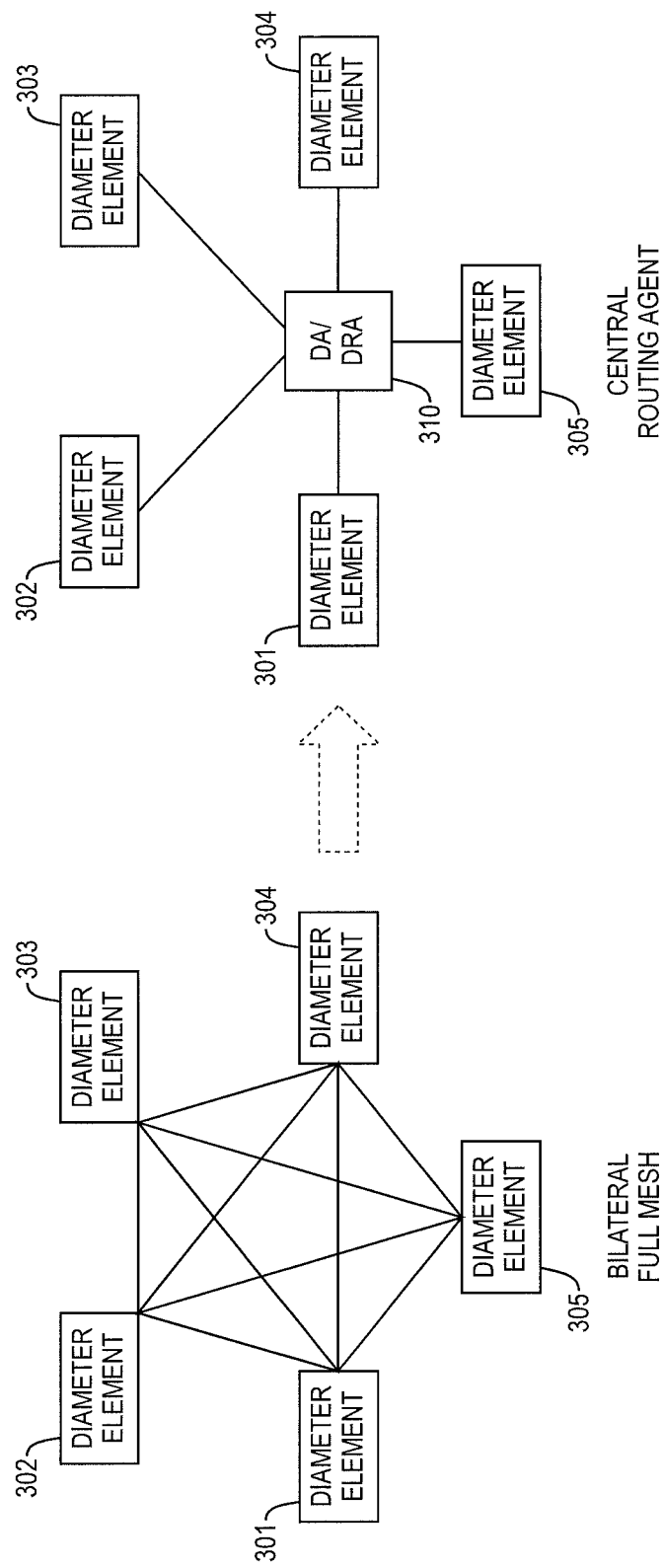
FIG. 3 shows two block diagrams illustrating a bilateral full-mesh architecture and centralized DA based architecture, respectively.

In another aspect, considering the roaming scenario according to FIG. 2, the DR/DRA 310 used to assist the S6a interface 105 and the S9 interface 218 interfaces between visited and home LTE mobile networks helps reduce the signaling traffic from the visited network to the home network. In another aspect, the mechanism may be implemented directly in a Diameter element such as the MME 101 to generate less signaling traffic.

Figure 4A:
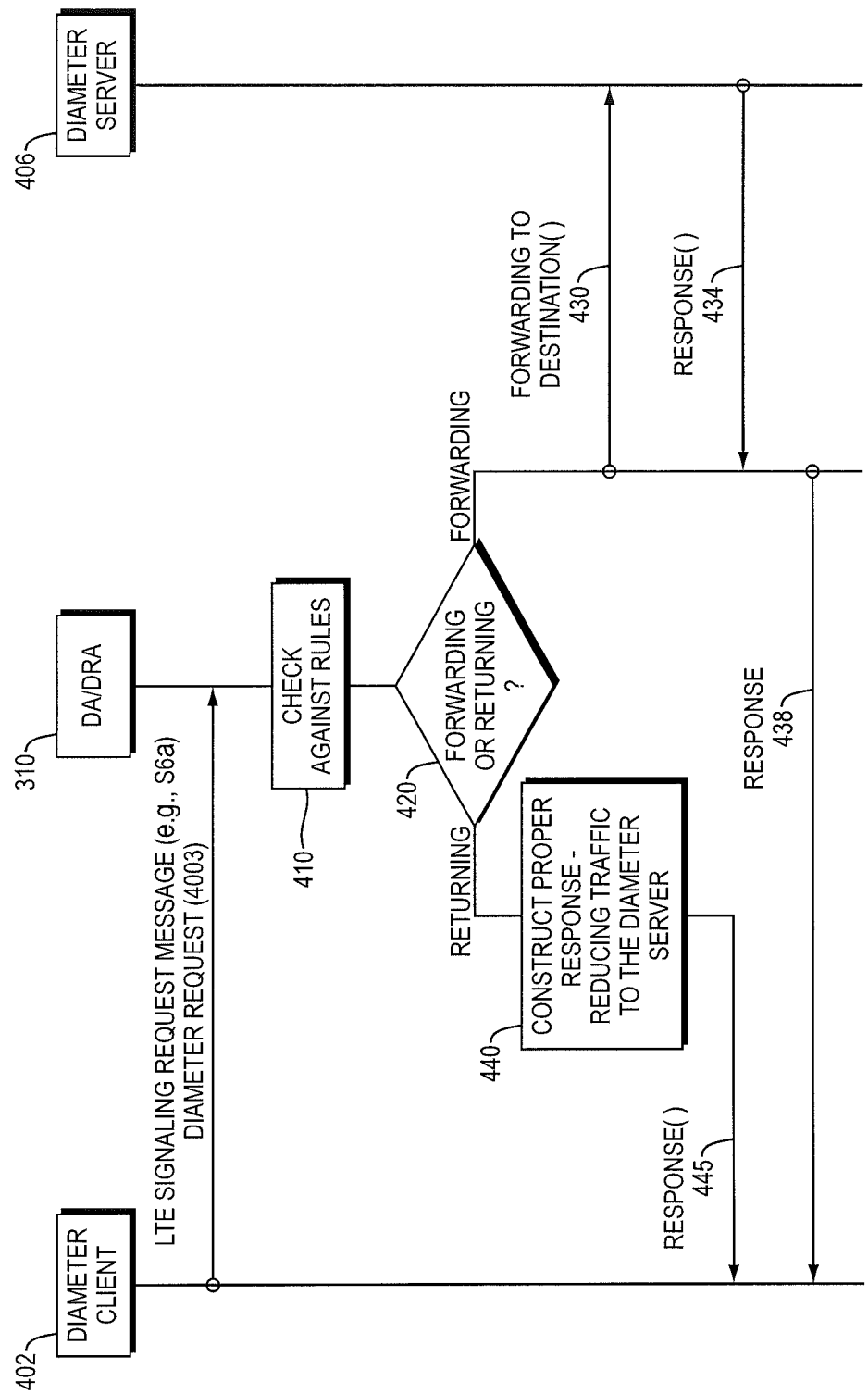
FIG. 4A shows a rule-based logic flow for reducing signaling traffic volume, destined to a receiving signaling element, within a DA, or DRA.

FIG. 4A shows a rule-based logic flow for reducing signaling traffic volume, destined to a receiving signaling element, within a DA, or DRA, 310. A Diameter signaling message is generated from a Diameter element 402 triggered by certain actions dictated by designed procedures within the LTE element 402. For example, an MME 101 in an LTE core network may generate a Diameter signaling message when UE 113 is trying to access the LTE network or changes its position or tracking area after accessing the LTE network. The MME 101 then sends the signaling message to an HSS 103 over the S6a interface 105 either directly or via a Diameter routing agent (DRA) 310. Under common practice, the generated Diameter signaling message destined for the recipient Diameter element 406 is sent to a Diameter routing agent 310. According to at least one embodiment, the DRA 310 is configured to handle and route the Diameter signaling message in a way to optimize network operation and reduce signaling traffic.

The Diameter routing agent 310 normally would forward the received message to its destination after certain actions applied to the received message. For example, such actions include, for example, changing certain attribute values of the signaling message, or adding other attributes which are not included in the original signaling message. According to example embodiments, however, different logic and actions are performed by the Diameter routing agent 310 so that the received message is acted on according to predefined rules.

Upon receiving a signaling message, the DA/DRA 310 is configured to check predefined rules at block 410. Based on the rule checking result, the DA/DRA 310 determines at block 420 whether or not to forward the message to its destined Diameter element 406. If the signaling message is determined to be forwarded, the DA/DRA 310 forwards the signaling message 430 to the destined element 406 and receives a corresponding response 434 from the Diameter element 406. The DA/DRA then sends 438 the received response to the originating Diameter element 402. If the signaling message is determined at block 420 not to be forwarded, the DA/DRA 310 generates a response 440 and sends the generated response 445 directly to the originating Diameter element 402 without forwarding to the destined element 406. By not forwarding the signaling message to the destined element 405, the DA/DRA 310 reduces the signaling traffic volume for the signaling element 406.

According to at least one embodiment, a set of rules for handling Diameter Signaling over S6a interface 105 in a LTE core network or a LTE roaming network may be defined as follows:

If received message is an Authentication Information Request (AIR) message, then forward the received message to its target destination, e.g., HSS 103.

If received message is an Update Location Request (ULR) message and if it is the first one of its kind received after an AIR message, then forward to the target destination, e.g., HSS 103. Otherwise, if the received ULR message is not the first one of its kind received after the AIR message, e.g., the ULR message was received before, then generate a response and send it to the originating element 402. In generating the response, information learned from a message received in response to the first ULR message forwarded to the target destination 406.

If the received signaling message is generated from the same Diameter element, e.g., MME 101, as previously received signaling message corresponding to the same user, then the signaling message is forwarded only if it is an AIR message. Otherwise, a response is generated and sent back to the originating element 402. In other words, a non-AIR signaling message received from the same Diameter element indicates that the corresponding UE 113 is moving around or within the same area(s) controlled by the same MME 101.

If the received signaling message is generated from a different Diameter element, within the same LTE core network, than a previously received signaling message and if the corresponding UE 113 only provides IP address, e.g., data modem device, then only the signaling message is forwarded to the destination element 406 only if it is the first AIR message or the first ULR message. Otherwise, a response message is generated by the DA/DRA 310 and sent to the originating element 402.

At pre-defined time of the day, or time period of the day, all other rules are bypassed and the signaling message is forwarded to the destination element 406.

FIG. 4B shows a rule-based logic flow for reducing signaling traffic volume within an existing signaling element. According to at least one embodiment, as depicted in FIG. 4B, the rules are implemented directly in a Diameter element, 403 such as the MME 101, where such logic is used to determine whether or not to generate and send a Diameter Signaling messaged. Signaling traffic volume is reduced by reducing the number of Diameter signaling messages generated and sent to a corresponding destination element. A Diameter Signaling process at the signaling element 403 checks the pre-defined rules at block 460 before generating the associated Diameter message. At block 470, the Diameter signaling element 403 determines whether or not to generate and send a signaling message based on the rule checking at block 460. If it is determined that the signaling message is to be generated and forwarded to the corresponding destination element, then the Diameter message is generated 480 and sent to the destination element. However, if it is determined that the signaling message is not to be generated and sent, then the Diameter message is not generated 490.

Figure 5A:
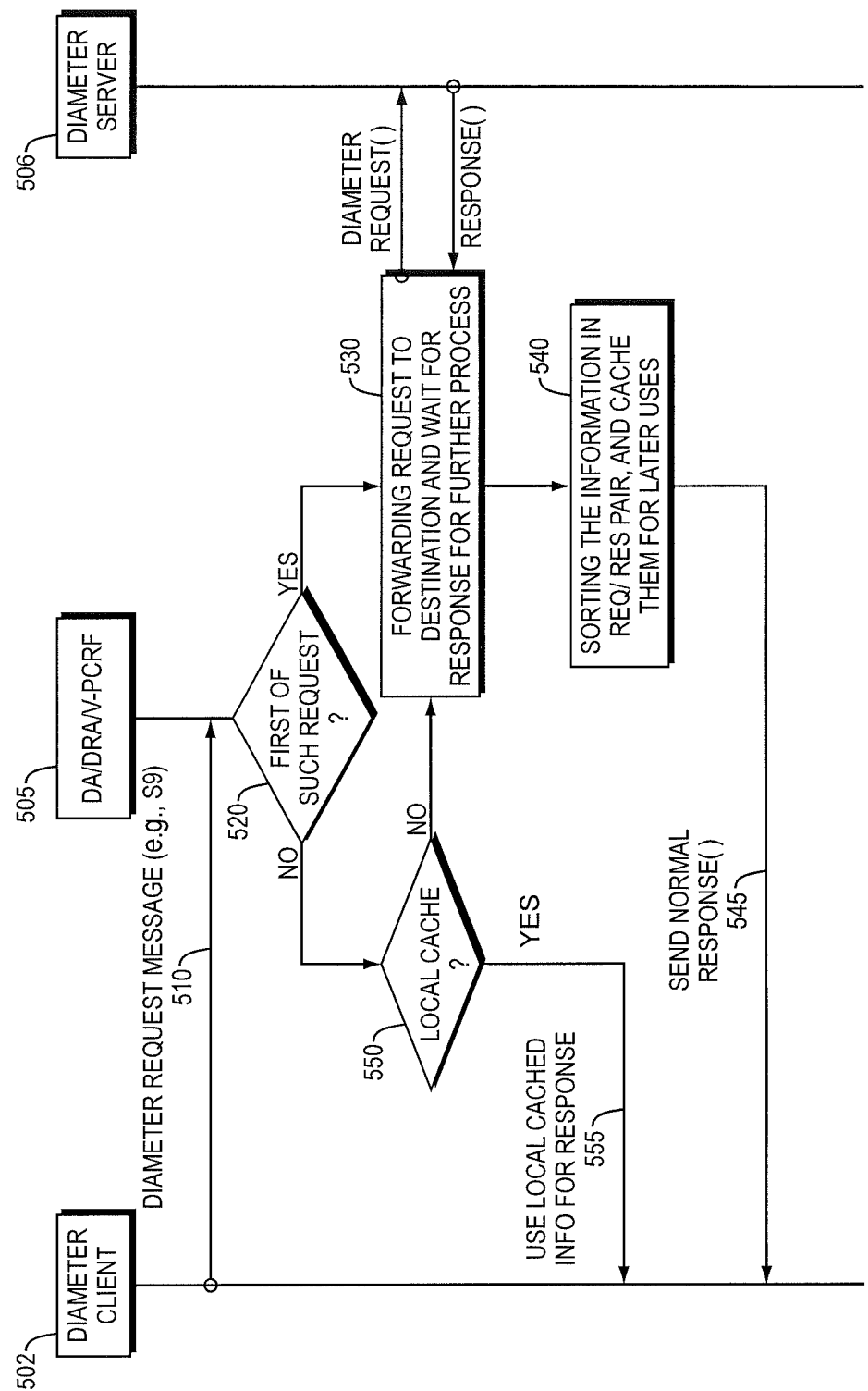
FIG. 5A shows a caching-based logic flow for reducing signaling traffic volume destined for a recipient signaling element.

FIG. 5A shows a caching-based logic flow for reducing signaling traffic volume destined for a recipient signaling element. According to at least one embodiment, users service policies, e.g., policy for maximum allowed bandwidth for a user to consume, are provisioned and stored. For example, in the LTE Roaming architecture, the V-PCRF 107b may contact a roaming user's H-PCRF 107a for the roamer's service policies provisioned and allowed by the Home Mobile Operator when the roamer is using the visited LTE mobile network. The communication is fulfilled by Diameter signaling between the V-PCRF 107b and H-PCRF 107a nodes. Such Diameter signaling is communicated through a signaling routing agent 505. According to at least one embodiment, the signaling routing agent, e.g., DA/DRA, 505 is configured to cache certain service policies information and use the cached information for generating a response to a next request without forwarding the next request to the destined element 506. By caching service policies' information and using the cached information in generating responses to received requests, the signaling traffic volume to the destined Diameter element 506 is reduced.

A Diameter signaling message is sent 510 from a Diameter element 502, e.g., V-PCRF 107b, to the signaling routing agent 505. At block 520, the signaling routing agent 505 determines whether the received request message is the first of its kind associated with the corresponding user. If it is determined at block 520 that the received signaling message is the first of its kind, the signaling routing agent 505, e.g., DA/DRA/V-PCRF, reacts to the received signaling message 530 by forwarding the request message to its destined element 506 and receiving a corresponding response message from the Diameter Element 506. At block 540, information associated with the forwarded signaling message and the corresponding response is cached, for example, per a set of rules which are defined according to service specifics. The received response message is then forwarded 545 to the originating Diameter element 502. The cached information is used to handle following signaling messages associated with the same user. In particular, the cached information is used to generate a response to a following request associated with the same user and therefore avoid forwarding the request to its destined element, e.g., 506.

However, if the received message is determined at block 520 not to be the first of its kind, the local cache is examined at block 550 to determine the presence of cached information. If there is no local cached information to respond to the request in the received signaling message, the received signaling message is forwarded to its destined Diameter element 506 and the corresponding response message is received from the Diameter Element 506 at block 530. Information associated with the signaling message and the corresponding response message is cached at block 540 per the set of rules defined according to service specifics. The response message is then forwarded 545 to the originating Diameter element 502.

If it is determined at block 550 that there is local cached information sufficient to handle the request, an appropriate response is generated and sent back 555 to the originating Diameter Element 502 from the DA/DRA 505. By generating a response at the DA/DRA 505 and not forwarding the received signaling message, the signaling traffic volume to the destined Diameter element 506 is reduced. According to at least one embodiment, rules for performing caching include; if the received response contains static or infrequently changed information associated with the targeted user, then cache the data locally for signal reduction purposes. Example of static or infrequently information include information associated with the user's QoS or service profile, which is normally stays the same when roaming to another network, such as maximum data usage, maximum bandwidth per session, allowed service(s), and default APN and P-GW.

Different rules may be created or defined based on a variety of service scenarios in the LTE roaming environment. In some cases, the existing information may be replaced with a partial or totally different set of information if the involved home mobile network operator (MNO) permits to do so. For example, the home operator may leverage this platform to provide a different set of QoS profiles for roaming to other visited networks while keep another set of QoS profiles for domestic services.

FIG. 5B shows a logic flow for controlling reset of cached information. The cached information may be reset with different approaches, such as pre-determined policies for resetting 570 or a system defined API 580 for external applications or received events to trigger the resetting logic 590. For example, pre-defined policies may consist of a duration timer for holding the information, or a maximum timer the information may be held regardless of other conditions, or a set of user group(s) who are targeted for caching. In another example, the external API is provided to allow external applications or events to trigger the resetting process. Such events may be coming from one or Diameter elements, e.g., HSS 103 sending Insert Subscribe Data (ISD) when user information has been updated, or system operation to force the resetting process due to any operational reasons.

It should be understood that the example embodiments described above may be implemented in many different ways. In some instances, the various DA/DRA, "data processors" or networking devices described herein may each be implemented by a physical or virtual general purpose computer having a central processor, memory, disk or other mass storage, communication interface(s), input/output (I/O) device(s), and other peripherals. The general purpose computer is transformed into the processor and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for handling signaling in a mobile communication system, the method comprising:
   receiving, at a network device, a signaling message associated with a user from an origination signaling element, the signaling message destined for a destination signaling element;
   determining, by the network device, whether or not to forward the signaling message to the destination signaling element based on previously stored information associated with the user and one or more rules for handling signaling;

if it is determined not to forward the signaling message, returning a response based on the previously stored information to the origination signaling element without forwarding the signaling message to the destination signaling element;

if it is determined to forward the signaling message, forwarding the signaling message to the destination signaling element, receiving a response from the destination signaling element, returning the response to the origination signaling element, and storing information associated with the signaling message or the response received for use in handling further signaling messages associated with the user; and resetting the stored information;

wherein the one or more rules include:

upon determining that the signaling message associated with the user is received from the same origination signaling element as a previously received signaling message associated with the user, forwarding the received signaling message to the destination signaling element if the received signaling message is an authentication information request (AIR) message, otherwise returning a response to the origination signaling message.

2. The method of claim 1, wherein storing information associated with the signaling message or the response received includes storing static or infrequently changed information associated with the user and included in the signaling message or the response received.

3. The method of claim 1, wherein resetting the stored information is according to one or more pre-determined resetting rules.

4. The method of claim 1, wherein the one or more rules include forwarding the received signaling message upon determining that the received signaling message associated with the user is the first of its kind received.

5. The method of claim 1, wherein the one or more rules include forwarding the received signaling message upon determining that the received signaling message received is an authentication information request (AIR) message.

6. The method of claim 1, wherein the one or more rules include returning a response to the origination signaling element if information for responding to a request associated with the received signaling message is previously stored and accessible to the network device, otherwise forwarding the signaling message to the destination signaling element.

7. A method for handling signaling in a mobile communication system, the method comprising:

receiving, at a network device, a signaling message associated with a user from an origination signaling element, the signaling message destined for a destination signaling element;

determining, by the network device, whether or not to forward the signaling message to the destination signaling element based on previously stored information associated with the user and one or more rules for handling signaling;

if it is determined not to forward the signaling message, returning a response based on the previously stored information to the origination signaling element without forwarding the signaling message to the destination signaling element;

if it is determined to forward the signaling message, forwarding the signaling message to the destination signaling element, receiving a response from the destination signaling element, returning the response to the origination signaling element, and storing information associated with the signaling message or the response received for use in handling further signaling messages associated with the user; and resetting the stored information;

wherein the one or more rules include:

upon determining that the signaling message received and another previously received signaling message, both associated with the user, are received from different origination signaling elements and both messages are associated with an Internet protocol (IP) address, forwarding the signaling message to the destination signaling element only if the signaling message is the first authentication information request (AIR) message or the first update location request message received.

8. The method of claim 1, wherein the signaling message received is a Diameter protocol message.

9. A network device for handling signaling in a mobile communication system, the network device comprising:

a processor; and a memory with computer code instructions stored thereon, the processor and the memory, with the computer code instructions, are configured to cause the network device to:

receive a signaling message associated with a user from an origination signaling element, the signaling message destined for a destination signaling element;

determine whether or not to forward the signaling message to the destination signaling element based on previously stored information associated with the user and one or more rules for handling signaling;

if it is determined not to forward the signaling message,- return a response based on the previously stored information to the origination signaling element without forwarding the signaling message to the destination signaling element;

if it is determined to forward the signaling message, forward the signaling message to the destination signaling element, receive a response from the destination signaling element, return the response to the origination signaling element, and store information associated with the signaling message or the response received for use in handling further signaling messages associated with the user; and reset the stored information;

wherein the one or more rules include:

upon determining that the signaling message associated with the user is received from the same origination signaling element as a previously received signaling message associated with the user, forwarding the received signaling message to the destination signaling element if the received signaling message is an authentication information request (AIR) message, otherwise returning a response to the origination signaling message.

10. The network device of claim 9, wherein in storing information associated with the signaling message or the response received, the computer code instructions, are configured to further cause the network device to store static or infrequently changed information associated with the user and included in the signaling message or the response received.

11. The network device of claim 9, wherein the processor and the memory, with the computer code instructions, are configured to further cause the network device to reset the stored information according to one or more pre-determined resetting rules.

12. The network device of claim 9, wherein the one or more rules include forwarding the received signaling message upon determining that the received signaling message associated with the user is the first of its kind received.

13. The network device of claim 9, wherein the one or more rules include forwarding the received signaling message upon determining that the received signaling message received is an authentication information request (AIR) message.

14. The network device of claim 9, wherein the one or more rules include returning a response to the origination signaling element if information for responding to a request associated with the received signaling message is available to the agent, otherwise forwarding the signaling message to the destination signaling element.

15. A network device for handling signaling in a mobile communication system, the network device comprising:
a processor, and
a memory with computer code instructions stored thereon, the processor and the memory, with the computer code instructions, are configured to cause the network device to:
receive a signaling message associated with a user from an origination signaling element, the signaling message destined for a destination signaling element;
determine whether or not to forward the signaling message to the destination signaling element based on previously stored information associated with the user and one or more rules for handling signaling;
if it is determined not to forward the signaling message,- return a response based on the previously stored information to the origination signaling element without forwarding the signaling message to the destination signaling element;
if it is determined to forward the signaling message, forward the signaling message to the destination signaling element, receive a response from the destination signaling element, return the response to the origination signaling element, and store information associated with the signaling message or the response received for use in handling further signaling messages associated with the user; and
reset the stored information;
wherein the one or more rules include:
upon determining that the signaling message received and another previously received signaling message, both associated with the user, are received from different origination signaling elements and both messages are associated with an Internet protocol (IP) address, forwarding the signaling message to the destination signaling element only if the diameter signaling message is the first authentication information request (AIR) message or the first update location request message received.

16. The network device of claim 9, wherein the signaling message received is a Diameter protocol message.

17. A non-transitory computer-readable medium with computer code instructions stored thereon, the computer code instructions when executed by a processor cause an apparatus to:
receive a signaling message associated with a user from an origination signaling element, the signaling message destined for a destination signaling element;
determine whether or not to forward the signaling message to the destination signaling element based on previously stored information associated with the user and one or more rules for handling signaling;
if it is determined not to forward the signaling message, return a response based on the previously stored information to the origination signaling element without forwarding the signaling message to the destination signaling element,
if it is determined to forward the signaling message, forward the signaling message to the destination signaling element, receive a response from the destination signaling element, return the response to the origination signaling element, and store information associated with the signaling message or the response received for use in handling further signaling messages associated with the user; and
reset the stored information;
wherein the one or more rules include:
upon determining that the signaling message associated with the user is received from the same origination signaling element as a previously received signaling message associated with the user, forwarding the received signaling message to the destination signaling element if the received signaling message is an authentication information request (AIR) message, otherwise returning a response to the origination signaling message.

18. The method of claim 1, wherein resetting the stored information is based on an external API configured to allow external applications or events to trigger the resetting.

19. The network device of claim 9, wherein resetting the stored information is based on an external API configured to allow external applications or events to trigger the reset.

20. A non-transitory computer-readable medium with computer code instructions stored thereon, the computer code instructions when executed by a processor cause an apparatus to:
receive a signaling message associated with a user from an origination signaling element, the signaling message destined for a destination signaling element;
determine whether or not to forward the signaling message to the destination signaling element based on previously stored information associated with the user and one or more rules for handling signaling;
if it is determined not to forward the signaling message, return a response based on the previously stored information to the origination signaling element without forwarding the signaling message to the destination signaling element,
if it is determined to forward the signaling message, forward the signaling message to the destination signaling element, receive a response from the destination signaling element, return the response to the origination signaling element, and store information associated with the signaling message or the response received for use in handling further signaling messages associated with the user; and
reset the stored information;
wherein the one or more rules include:
upon determining that the signaling message received and another previously received signaling message, both associated with the user, are received from different origination signaling elements and both messages are associated with an Internet protocol (IP) address, forwarding the signaling message to the destination signaling element only if the diameter signaling message is the first authentication information request (AIR) message or the first update location request message received.

* * * * *